(12) United States Patent
Yun et al.

(10) Patent No.: US 10,053,378 B2
(45) Date of Patent: Aug. 21, 2018

(54) FORWARD OSMOSIS-TYPE FRESH WATER COMPOSITE SYSTEM

(71) Applicant: DOOSAN HEAVY INDUSTRIES & CONSTRUCTION CO., LTD., Changwon-Si, Gyeongsangnam-Do (KR)

(72) Inventors: Choamun Yun, Daejeon (KR); Taewon Lee, Daejeon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 9 days.

(21) Appl. No.: 14/758,446

(22) PCT Filed: Dec. 9, 2013

(86) PCT No.: PCT/KR2013/011364
§ 371 (c)(1),
(2) Date: Jun. 29, 2015

(87) PCT Pub. No.: WO2014/104613
PCT Pub. Date: Jul. 3, 2014

(65) Prior Publication Data
US 2015/0353384 A1    Dec. 10, 2015

(30) Foreign Application Priority Data
Dec. 31, 2012  (KR) ............. 10-2012-0158639

(51) Int. Cl.
*H01M 8/14* (2006.01)
*C02F 1/44* (2006.01)
(Continued)

(52) U.S. Cl.
CPC .......... *C02F 1/445* (2013.01); *B01D 53/1475* (2013.01); *B01D 53/62* (2013.01);
(Continued)

(58) Field of Classification Search
None
See application file for complete search history.

(56) References Cited

U.S. PATENT DOCUMENTS 3,130,156 A * 4/1964 Neff ................... B01D 61/002
                                                                210/177
5,169,717 A * 12/1992 Topsoe ................ C01C 1/0476
                                                                 423/359
(Continued)

FOREIGN PATENT DOCUMENTS

JP       2009-245702 A    10/2009
KR  10-2009-0038623 A     4/2009
(Continued)

OTHER PUBLICATIONS

International Search Report for PCT/KR2013/011364 dated Dec. 31, 2013 English Translation.
(Continued)

*Primary Examiner* — Krishnan S Menon
(74) *Attorney, Agent, or Firm* — Sughrue Mion, PLLC

(57) ABSTRACT

According to one embodiment of the present invention, a forward osmosis-type fresh water composite system includes: a fuel cell device that has a cathode electrode in which carbon dioxide supplied from a plant is converted into carbonate ion ($CO_3^{2-}$) and an anode electrode that produces electric energy by reacting the carbonate ion ($CO_3^{2-}$) with hydrogen and discharges the carbon dioxide; and a carbon dioxide collection unit that reacts the carbon dioxide supplied from the fuel cell device and water supplied from the outside with ammonia separated from a draw solution separation unit so as to produce a high-concentration draw solution and then supplies the high-concentration draw solution to a forward osmosis separation device.

7 Claims, 4 Drawing Sheets

(51) Int. Cl.
    *B01D 61/00*     (2006.01)
    *H01M 8/04007*   (2016.01)
    *H01M 8/0668*    (2016.01)
    *B01D 53/62*     (2006.01)
    *B01D 53/14*     (2006.01)
    *C02F 103/08*    (2006.01)

(52) U.S. Cl.
    CPC ......... *B01D 61/002* (2013.01); *B01D 61/005* (2013.01); *H01M 8/04007* (2013.01); *H01M 8/0668* (2013.01); *B01D 2252/102* (2013.01); *B01D 2252/103* (2013.01); *B01D 2258/0283* (2013.01); *C02F 2103/08* (2013.01); *C02F 2303/10* (2013.01); *H01M 2008/147* (2013.01); *H01M 2250/00* (2013.01); *Y02A 20/131* (2018.01); *Y02C 10/04* (2013.01); *Y02C 10/06* (2013.01); *Y02E 60/526* (2013.01); *Y02W 10/30* (2015.05)

(56) References Cited

U.S. PATENT DOCUMENTS

2009/0308727 A1   12/2009   Kirts
2011/0100218 A1    5/2011   Wolfe
2012/0067819 A1    3/2012   McGinnis

FOREIGN PATENT DOCUMENTS

KR    10-2012-0064320 A    6/2012
KR       10-1190610 B1    10/2012

OTHER PUBLICATIONS

Extended European Search Report dated Dec. 7, 2016 in corresponding European Patent Application No. 13868854.4.

\* cited by examiner

FORWARD OSMOSIS-TYPE FRESH WATER COMPOSITE SYSTEM

CROSS REFERENCE TO RELATED APPLICATIONS

This application is a National Stage of International Application No. PCT/KR2013/011364 filed Dec. 9, 2013, claiming priority based on Korean Patent Application No. 10-2012-0158639, filed Dec. 31, 2012, the contents of all of which are incorporated herein by reference in their entirety.

TECHNICAL FIELD

Embodiments of the present invention relates to a composite system complexly including a fuel cell apparatus and a forward osmosis type fresh water composite apparatus.

BACKGROUND ART

About 97% of water on earth is seawater, and gets an absolute majority of the amount of water. However, it is difficult to use seawater as water for living or industrial water because seawater has very high salinity. The desalination of seawater has been in the spotlight in a situation in which insufficient surface water is supplemented and shortage of water becomes worse.

Desalination is a series of processes for suitably removing salt so that salty seawater can be used for drinking water or other purposes. A salt concentration is divided into fresh water, brackish water, and seawater depending on the degree that salt is dissolved in water.

Salt needs to be removed from seawater in order to use seawater as drinking water because seawater includes many types of salt. A method of using a film distillation process, a backward osmosis film, or a forward osmosis film may be taken into consideration as a method of desalinating seawater.

Meanwhile, flue gases discharged by an industry plant, such as a power plant, exert a bad influence on an environment because they include a large amount of carbon dioxide affecting global warming and an atmospheric change. Accordingly, several methods are being used in order to remove carbon dioxide included in flue gases discharged by a fossil fuel power plant.

A prior art related to a method of separating carbon dioxide from flue gases discharged by an industry plant includes Korean Patent Application Publication No. 10-2009-0038623. A method of recovering the flue gases of a plant using fossil fuel to carbon dioxide using ammonia water is described in the prior art.

A method of exclusively supplying flue gases from a plant using fossil fuel to the cathode part of a fuel cell and isolating carbon dioxide included in exhaust gases discharged from an anode using a carbon dioxide separator is described in the prior art.

However, the prior art was problematic in that the carbon dioxide separator needs to be separately installed in the plant in order to separate carbon dioxide. This resulted in problems in which plant power generation efficiency is deteriorated and an installation cost is increased. Furthermore, the prior art has a problem in that an existing plant cannot be used because the process of separating carbon dioxide is not arranged and associated with the plant.

DISCLOSURE

Technical Problem

An object of the present invention is to provide a forward osmosis type fresh water composite system including apparatuses different from those of an existing system.

Another object of the present invention is to provide a forward osmosis type fresh water composite system which has further improved carbon dioxide collection efficiency and can improve thermal efficiency of the entire system.

Technical Solution

To achieve the above objects of the present invention, a forward osmosis type fresh water composite system in accordance with an embodiment of the present invention includes a fuel cell apparatus comprising a cathode electrode in which carbon dioxide supplied from a plant is converted into carbonate ions ($CO_3^{2-}$) and an anode electrode which generates electric energy by a reaction of the carbonate ions ($CO_3^{2-}$) and hydrogen and discharges carbon dioxide and a carbon dioxide collection unit which generates a draw solution of a high concentration by a reaction of the carbon dioxide supplied by the fuel cell apparatus and externally supplied water with ammonia separated by a draw solution separation unit and supplies the draw solution to a forward osmosis separation apparatus.

In accordance with an example related to the present invention, the forward osmosis type fresh water composite may further include a heat recovery steam generator which is supplied with exhaust gases of the fuel cell apparatus and supplies thermal energy to the draw solution separation unit.

In accordance with an example related to the present invention, the carbon dioxide collection unit may be supplied with carbon dioxide from the heat recovery steam generator.

In accordance with an example related to the present invention, the draw solution separation unit may be supplied with the thermal energy from the heat recovery steam generator, and may separate a draw solution of a low concentration supplied by the forward osmosis separation apparatus into ammonia, water, and carbon dioxide.

Furthermore, to achieve the above objects of the present invention, another embodiment of the present invention discloses a forward osmosis type fresh water composite system, including a carbon dioxide collection unit which generates a draw solution of a high concentration by a reaction of carbon dioxide supplied by a plant and externally supplied water with ammonia separated by a draw solution separation unit and supplies the draw solution to a forward osmosis separation apparatus and a fuel cell apparatus comprising a cathode electrode which is supplied with carbon dioxide separated by the draw solution separation unit and converts the carbon dioxide into carbonate ions ($CO_3^{2-}$) and an anode electrode which produces electric energy by a reaction of the carbonate ions ($CO_3^{2-}$) and hydrogen and discharges carbon dioxide.

In accordance with an example related to the present invention, the forward osmosis type fresh water composite system may further include a heat recovery steam generator which is supplied with exhaust gases of the fuel cell apparatus and supplies thermal energy to the draw solution separation unit.

In accordance with an example related to the present invention, the draw solution separation unit may be supplied with the thermal energy from the heat recovery steam generator and may separate ammonia, water, and carbon dioxide from a draw solution of a low concentration supplied by the forward osmosis separation apparatus.

Advantageous Effects

The forward osmosis type fresh water composite system related to at least one embodiment of the present invention configured as described above can supply carbon dioxide of exhaust gases discharged by a carbon dioxide discharge facility to the fresh water apparatus through the fuel cell apparatus and thus can improve collection efficiency of carbon dioxide.

Furthermore, thermal efficiency of the entire system can be improved because heat is supplied by a carbon dioxide discharge facility or the fuel cell apparatus and supplied to the draw solution separation unit.

MODE FOR INVENTION

Figure 1:
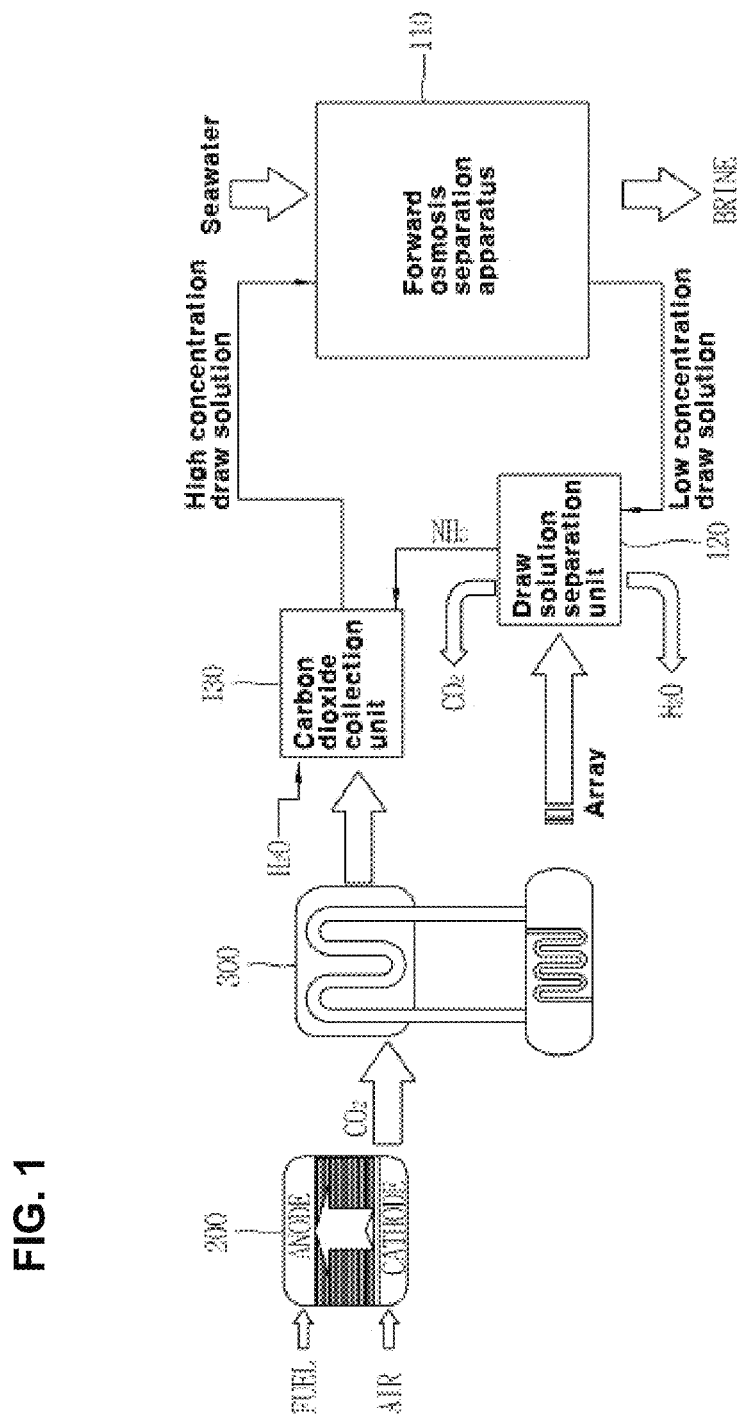
FIG. 1 is a conceptual diagram of a fresh water system related to embodiments of the present invention.

Hereinafter, forward osmosis type fresh water composite systems related to the present invention are described in detail with reference to the drawings. The suffixes of constituent elements used in the following description, such as "module" and "unit," are assigned or interchangeable with each other by taking into consideration only the easiness of writing this specification, but in themselves are not particularly given distinct meanings and roles. In this specification, the same or similar reference numerals are assigned to the same or similar constituent elements in different embodiments, and a description thereof is replaced with the first description, an expression of the singular number used in this specification includes an expression of the plural number unless clearly defined otherwise in the context.

FIG. 1 is a conceptual diagram of a fresh water system related to embodiments of the present invention.

Referring to FIG. 1, the fresh water system may include a fuel cell apparatus 200 and a forward osmosis separation apparatus 110. Furthermore, the fresh water system may further include a heat recovery steam generator (HRSG) 300 associated with the fuel cell apparatus 200. In this case, the fuel cell apparatus includes a cathode electrode in which carbon dioxide is converted into carbonate ions ($CO_3^{2-}$) and an anode electrode for producing electric energy by a reaction of the carbonate ions ($CO_3^{2-}$) and hydrogen and discharging carbon dioxide, and a detailed configuration thereof is described later.

Furthermore, a carbon dioxide collection unit 130 and a draw solution separation unit 120 may be formed between the forward osmosis separation apparatus 110 and the heat recovery steam generator 300.

The carbon dioxide collection unit 130 is configured to produce a draw solution of a high concentration by a reaction of carbon dioxide supplied by the fuel cell apparatus 200 and external water with ammonia separated by the draw solution separation unit 120 and to supply the draw solution to the forward osmosis separation apparatus 110.

Furthermore, the draw solution separation unit 120 is configured to be supplied with thermal energy from the heat recovery steam generator 300 and to separate a draw solution of a low concentration, supplied by the forward osmosis separation apparatus 110, into ammonia ($NH_3$), water, and carbon dioxide.

Figure 2:
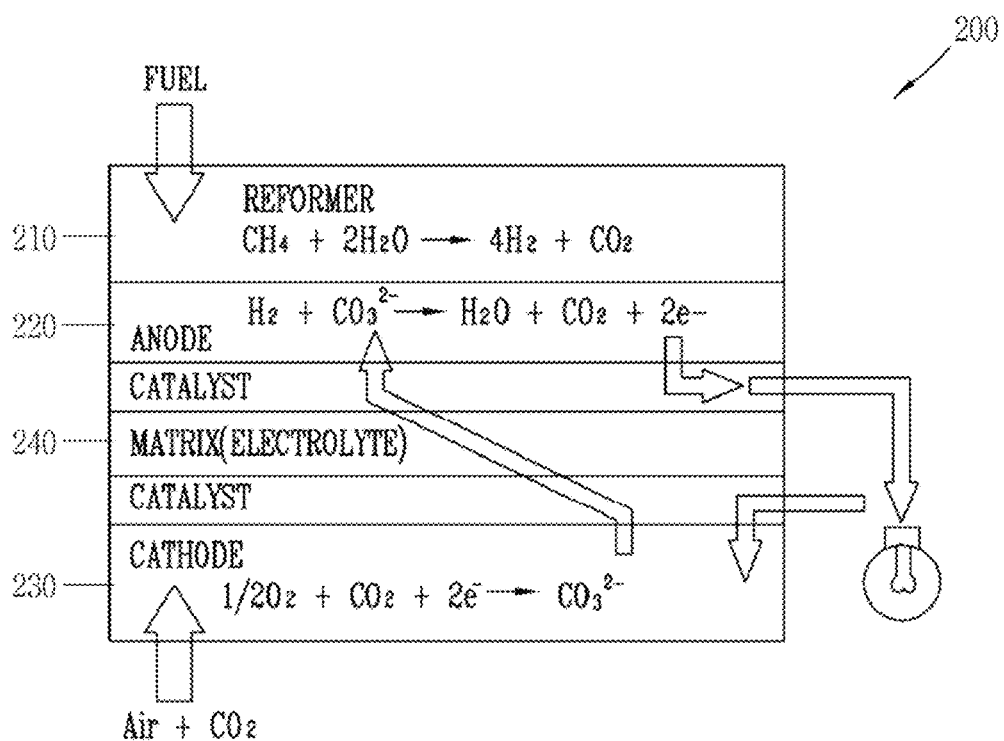
FIG. 2 is a conceptual diagram of a fuel cell apparatus related to the present invention.

FIG. 2 is a conceptual diagram of a fuel cell apparatus 200 related to the present invention.

The type of fuel cell is various, such as a phosphoric acid fuel cell, an alkaline fuel cell, a proton exchange membrane fuel cell, a molten carbonate fuel cell, a solid oxide fuel cell, and a direct methanol fuel cell. Such fuel cells described above operate based on the same principle in terms of fuel, but are divided depending on the type of fuel, an operating temperature, and a catalyst.

From among the fuel cells, in particular, the molten carbonate fuel cell (MCFC) has high electrochemical response speed because it operates at a high temperature of 650° C. or more, and is advantageous in an economic feasibility because nickel can be used as an electrode material instead of a platinum catalyst.

Furthermore, if a bottoming cycle using a heat recovery steam generator is applied to the molten carbonate fuel cell, thermal efficiency of the entire power generation system can be improved by 60% or more if high-temperature waste heat of good quality is recovered and used.

Furthermore, the molten carbonate fuel cell is advantageous in that it can adopt an internal reforming type in which a fuel reforming reaction is simultaneously performed within a fuel cell stack in which an electrochemical reaction is generated because the molten carbonate fuel cell operates at a high temperature.

Such an internal reforming type molten carbonate fuel cell is advantageous in that thermal efficiency of the entire system is further improved and a system configuration is simplified compared to an external reforming type molten carbonate fuel cell because heat generated in an electrochemical reaction is directly used in a reforming reaction, that is, a heat absorption reaction, without a separate external heat exchanger.

The fuel cell apparatus 200 may include a fuel supply unit for supplying a specific amount of fuel, a reformer 210 for being supplied with fuel from the fuel supply unit and generating by-products including hydrogen gas and heat, and a stack unit for generating electricity and heat by an electrochemical reaction of hydrogen gas generated from the reformer 210 and separately supplied oxygen.

The stack unit may include a plurality of stacked unit cells each including the reformer 210, an anode electrode 220, and an electrolyte membrane 240, and a cathode electrode 230.

The fuel cell module operates as follows.

First, when the fuel supply unit supplies the reformer 210 with water and fuel including liquefied natural gas (so-called LNG) or a methane ($CH_4$) component, a steam reforming reaction and a water gas shift reaction are complexly generated in the reformer 210, thereby generating hydrogen gas, reaction heat, and other by-products including water.

$$CH_4 + 2H_2O \rightarrow 4H_2 + CO_2$$

Furthermore, the stack unit produces carbonate ions ($CO_3^{2-}$) by a reaction of hydrogen gas supplied by the reformer 210 and oxygen and carbon dioxide supplied to the cathode. The generated carbonate ions ($CO_3^{2-}$) generate an electrochemical reaction, thus generating electricity, heat, and water are generated.

The electrochemical reaction generated in the unit cell forming the stack unit is described in more detail. First, the hydrogen gas ($H_2$) is supplied to the anode electrode 220, and an electrochemical oxidation reaction between the hydrogen gas ($H_2$) and carbonate ions ($CO_3^{2-}$) is generated, thus generating water, carbon dioxide, and electrons (e−).

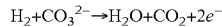
$$H_2 + CO_3^{2-} \rightarrow H_2O + CO_2 + 2e^-$$

Furthermore, in the cathode electrode (so-called the air electrode) 230, externally supplied oxygen, carbon dioxide, and electrons generate an electrochemical reduction reaction, thus generating carbonate ions ($CO_3^{2-}$), reaction heat, and water. The carbonate ions generated from the cathode electrode 230 move from the cathode electrode 230 to the anode electrode 220 through the electrolyte of the electrolyte membrane 240 placed between the cathode electrode 230 and the anode electrode 220. Electrons generated by the anode electrode 220 move via an external circuit, and thus electric energy is generated by the movement of the electrons. In this case, the electrolyte is present in a solid state under normal conditions, but the temperature of the electrolyte rises up to about 650° C. when the fuel cell system normally operates. As a result, the electrolyte is liquefied.

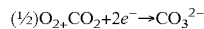
$$(\tfrac{1}{2})O_2 + CO_2 + 2e^- \rightarrow CO_3^{2-}$$

In this case, $CO_2$ is moved from the cathode electrode 230 to the anode electrode 220 through the electrolyte by an electrochemical reaction mechanism and concentrated. The concentrated $CO_2$ is separated from water and collected.

Figure 3:
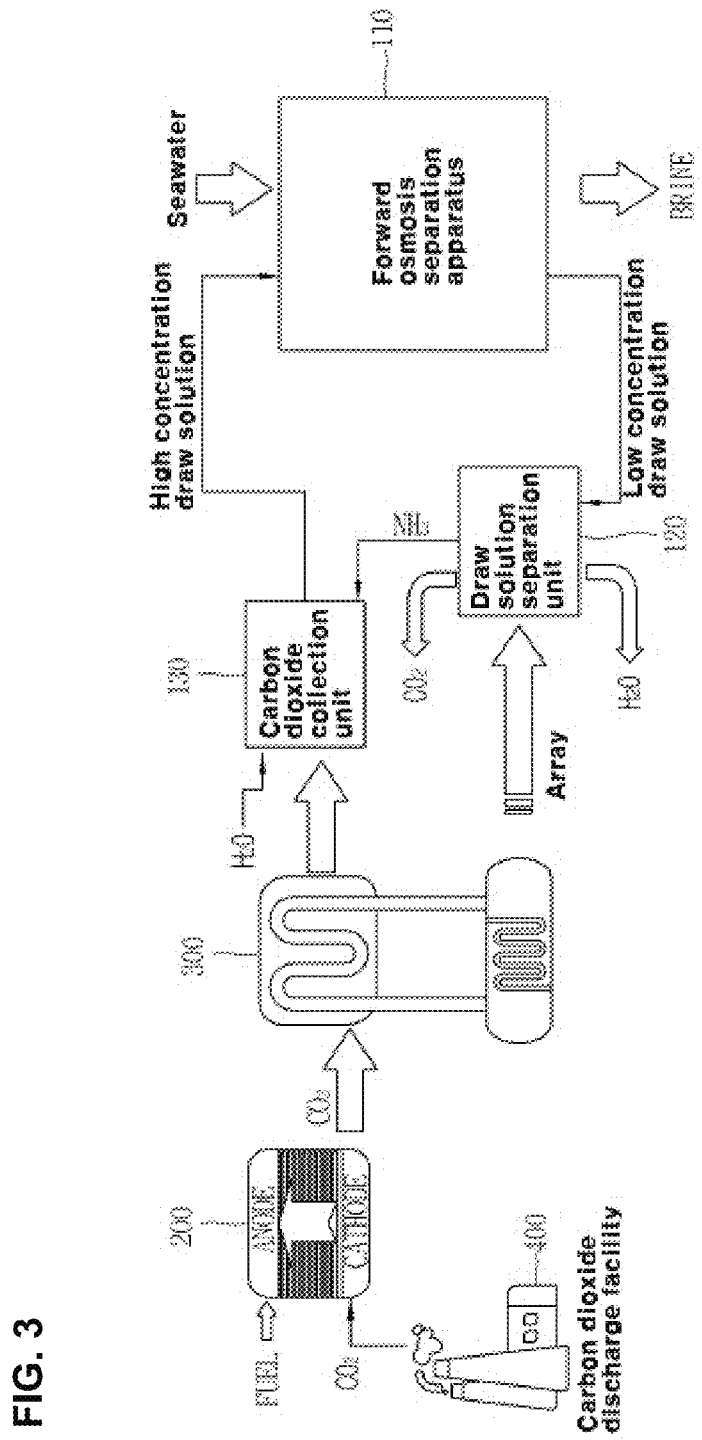
FIG. 3 is a conceptual diagram of a fresh water system in accordance with a first embodiment of the present invention.

FIG. 3 is a conceptual diagram of a forward osmosis type fresh water composite system in accordance with a first embodiment of the present invention.

Referring to FIG. 3, the forward osmosis type fresh water composite system may include a forward osmosis separation apparatus 110 and a fuel cell apparatus 200 associated with one of carbon dioxide discharge facilities 400.

Furthermore, the forward osmosis type fresh water composite system may further include a heat recovery steam generator 300 associated with the fuel cell apparatus 200. In this case, the fuel cell apparatus 200, as described above, includes a cathode electrode in which carbon dioxide is converted into carbonate ions ($CO_3^{2-}$) and an anode electrode for producing electric energy by a reaction of the carbonate ions ($CO_3^{2-}$) and hydrogen and discharging carbon dioxide. Furthermore, a carbon dioxide collection unit 130 and a draw solution separation unit 120 may be formed between the forward osmosis separation apparatus 110 and the heat recovery steam generator 300.

The carbon dioxide collection unit 130 may be configured to produce a draw solution of a high concentration by a reaction of carbon dioxide supplied by the fuel cell apparatus 200 and externally supplied water with ammonia separated by the draw solution separation unit 120 and to supply the draw solution to the forward osmosis separation apparatus 110.

Furthermore, the draw solution separation unit 120 may be configured to be supplied with thermal energy from the heat recovery steam generator 300 and to separate a draw solution of a low concentration, supplied by the forward osmosis separation apparatus 110, into ammonia, water, and carbon dioxide.

The aforementioned carbon dioxide discharge facility 400 may be any one of plants which discharge carbon dioxide and heat using fossil fuel. The plant discharges thermal energy and exhaust gases. In this case, the thermal energy may be supplied to the heat recovery steam generator 300, or the exhaust gases including carbon dioxide may be supplied to the carbon dioxide collection unit 130. In contrast, the thermal energy or the exhaust gases may directly heat the draw solution separation unit 120 without passing through the heat recovery steam generator 300.

In the present invention, in particular, carbon dioxide included in the exhaust gases of the carbon dioxide discharge facility 400 is supplied to the fuel cell apparatus 200. In this case, the cathode electrode of the fuel cell apparatus 200 converts the supplied carbon dioxide into carbonate ions ($CO_3^{2-}$). The anode electrode produces electric energy by a reaction of the carbonate ions ($CO_3^{2-}$) and hydrogen and discharges the carbon dioxide. The heat recovery steam generator 300 receives the carbon dioxide supplied by the fuel cell apparatus 200 and supplies the supplied carbon dioxide to the carbon dioxide collection unit 130.

The forward osmosis separation apparatus 110 produces introduced original water into fresh water using a forward osmosis method. In this case, an ammonium bicarbonate ($NH_4HCO_3$) solution may be used as a draw solution. The original water introduced from the forward osmosis separation apparatus 110 is separated into fresh water and brine by ammonium bicarbonate ($NH_4HCO_3$). A draw substance of a high concentration to be used in the desalination of the forward osmosis separation apparatus 110 is supplied by the carbon dioxide collection unit 130. Next, the draw substance becomes a low-concentration draw substance through desalination. Such a low-concentration draw substance is supplied to the draw solution separation unit 120.

Steam is generated because the heat recovery steam generator 300 is supplied with thermal energy from the carbon dioxide discharge facility 400 or the fuel cell apparatus 200. Steam generated as described above is supplied to the draw solution separation unit 120 and is used to separate a draw solution and to produce water. In contrast, the thermal energy or exhaust gases of the carbon dioxide discharge facility or the fuel cell apparatus 200 may directly heat the draw solution separation unit 120 without passing through the heat recovery steam generator 300.

The draw solution separation unit 120 functions to separate a draw solution of a low concentration introduced from the forward osmosis separation apparatus 110 and produce water by recovering heat discharged by a plant or heat discharged by the fuel cell apparatus 200. More specifically, a draw solution of a low concentration including water is introduced from the forward osmosis separation apparatus 110 to the draw solution separation unit 120. The draw solution of a low concentration is separated into water ($H_2O$), carbon dioxide ($CO_2$), and ammonia ($NH_3$) by steam supplied by the heat recovery steam generator 300. Carbon dioxide and ammonia are separated by a difference in the boiling point. Carbon dioxide having a low boiling point is first separated by supplied steam, and collected, and stored. Ammonia that is subsequently boiled is introduced into the carbon dioxide collection unit 130. After carbon dioxide and ammonia are removed from a draw solution, water corresponding to a solvent remains.

The exhaust gases discharged by the carbon dioxide discharge facility 400 or the fuel cell apparatus 200 and ammonia separated from the draw solution by the draw solution separation unit 120 are supplied to the carbon dioxide collection unit 130. External water is supplied to the carbon dioxide collection unit 130. The carbon dioxide collection unit 130 collects carbon dioxide included in the exhaust gases using water and ammonia and generates a draw solution ($NH_4HCO_3$) of a high concentration to which the carbon dioxide and ammonia have been absorbed. In this case, the generated draw solution of a high concentration is supplied to the forward osmosis separation apparatus 110 and is used as a draw solution for a forward osmosis type fresh water process. In particular, the carbon dioxide collection unit 130 in accordance with the present invention generates a draw solution ($NH_4HCO_3$) of a high concentration using carbon dioxide included in the exhaust gases of the fuel cell apparatus 200 without discharging carbon dioxide.

As described above, the forward osmosis type fresh water composite system in accordance with the present invention can supply carbon dioxide included in exhaust gases discharged by the carbon dioxide discharge facility 400 to the fresh water apparatus through the fuel cell apparatus 200. Accordingly, collection efficiency of carbon dioxide can be improved.

Furthermore, thermal efficiency of the entire system can be improved because heat is supplied by the carbon dioxide discharge facility 400 or the fuel cell apparatus 200 and supplied to the draw solution separation unit 120.

Figure 4:
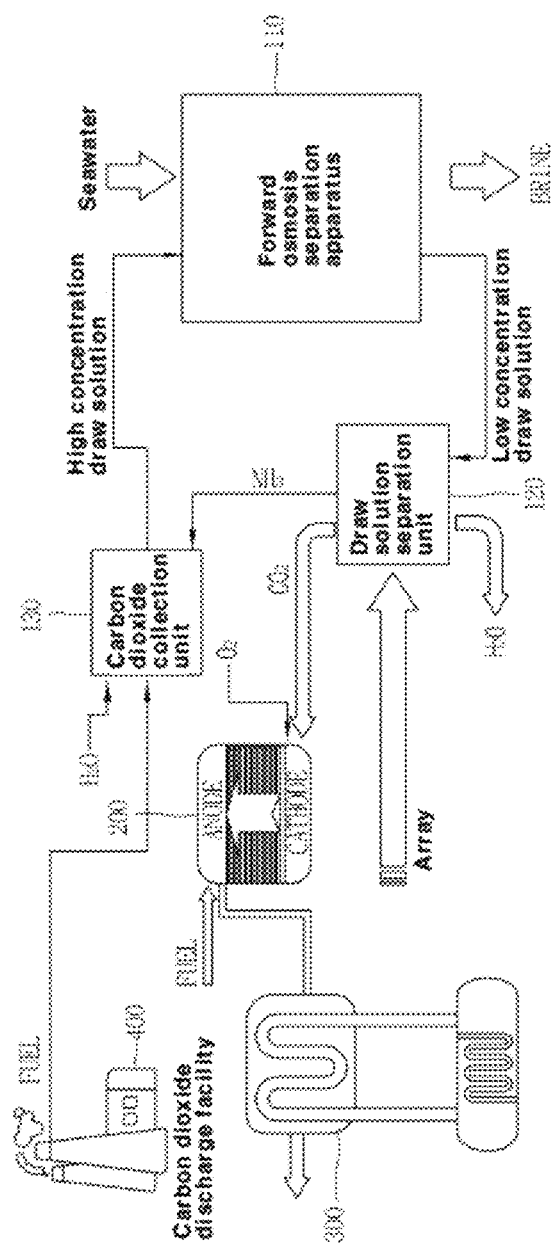
FIG. 4 is a conceptual diagram of a fresh water system in accordance with a second embodiment of the present invention.

FIG. 4 is a conceptual diagram of a forward osmosis type fresh water composite system in accordance with a second embodiment of the present invention. A description of elements that belong to the forward osmosis type fresh water composite system of FIG. 4 and that are the same as or similar to those of FIG. 3 is replaced with the description disclosed in FIG. 3.

Referring to FIG. 4, the forward osmosis type fresh water composite system may include a carbon dioxide collection unit 130, a draw solution separation unit 120, a forward osmosis separation apparatus 110, and a fuel cell apparatus 200.

Furthermore, the forward osmosis type fresh water composite system may further include a heat recovery steam generator 300. In this case, the fuel cell apparatus 200, as described above, includes a cathode electrode in which carbon dioxide is converted into carbonate ions ($CO_3^{2-}$) and an anode electrode for producing electric energy by a reaction of the carbonate ions ($CO_3^{2-}$) and hydrogen and discharging carbon dioxide.

The carbon dioxide collection unit 130 is associated with the carbon dioxide discharge facility 400. The carbon dioxide collection unit 130 may be configured to produce a draw solution of a high concentration by a reaction of carbon dioxide supplied by the carbon dioxide discharge facility 400 and externally supplied water with ammonia separated by the draw solution separation unit 120 and to supply the draw solution to the forward osmosis separation apparatus 110. In this case, discharged oxygen is supplied to the fuel cell apparatus 200. In this case, the carbon dioxide is not discharged to the outside.

Furthermore, the draw solution separation unit 120 may be configured to be supplied with thermal energy from the heat recovery steam generator 300 and to separate a draw solution of a low concentration, supplied by the forward osmosis separation apparatus 110, into ammonia, water, and carbon dioxide.

Unlike in the aforementioned embodiment, in the forward osmosis type fresh water composite system in accordance with the second embodiment of the present invention, carbon dioxide discharged by the carbon dioxide discharge facility 400 is directly supplied to the carbon dioxide collection unit 130. In this case, carbon dioxide discharged by the draw solution separation unit has a higher concentration than the carbon dioxide supplied by the carbon dioxide discharge facility 400.

The carbon dioxide discharged by the draw solution separation unit is supplied to the cathode electrode of the fuel cell apparatus 200 along with pure oxygen ($O_2$) generated using an air separation unit (ASU).

Accordingly, carbon dioxide of a high concentration can be supplied to the cathode electrode of the fuel cell apparatus 200. Accordingly, power generation efficiency of the fuel cell apparatus 200 can be improved because the utilization of carbon dioxide and partial pressure are increased. Furthermore, carbon dioxide is collected through forward osmosis fresh water, carbon dioxide supplied to the fuel cell apparatus is converted into carbonate ions by a reaction with oxygen and collected by the anode electrode again.

The forward osmosis type fresh water composite system described above is not limitedly applied to the configurations and methods of the aforementioned embodiments, but some or all of the embodiments may be selectively combined and configured so that the embodiments are modified in various ways.

INDUSTRIAL APPLICABILITY

Embodiments of the present invention may be applied to a fresh water system.

The invention claimed is:

1. An industrial plant comprising
a draw solution separation unit,
a forward osmosis separation apparatus, and
a forward osmosis type fresh water composite system comprising:
a fuel cell apparatus comprising a cathode electrode configured to be exclusively supplied with carbon dioxide from flue gases from the industrial plant, and which converts the carbon dioxide into carbonate ions ($CO_3^{2-}$), and an anode electrode which generates electric energy by a reaction of the carbonate ions ($CO_3^{2-}$) and hydrogen and which discharges carbon dioxide; and
a carbon dioxide collection unit which generates a draw solution of a high concentration by a reaction of the carbon dioxide supplied by the fuel cell apparatus and externally supplied water with ammonia separated by the draw solution separation unit and which supplies the draw solution to the forward osmosis separation apparatus.

2. The industrial plant of claim 1, wherein the forward osmosis type fresh water composite system further comprises a heat recovery steam generator which is supplied with exhaust gases of the fuel cell apparatus and which supplies thermal energy to the draw solution separation unit.

3. The industrial plant of claim 2, wherein the carbon dioxide collection unit is supplied with carbon dioxide from the heat recovery steam generator.

4. An industrial plant comprising:
a draw solution separation unit,
a forward osmosis separation apparatus, and
a forward osmosis type fresh water composite system comprising:
a carbon dioxide collection unit which generates a draw solution of a high concentration by a reaction of carbon dioxide supplied by the industrial plant and externally supplied water with ammonia separated by the draw solution separation unit and which supplies the draw solution to the forward osmosis separation apparatus; and a fuel cell apparatus comprising a cathode electrode which is supplied with carbon dioxide separated by the draw solution separation unit and which converts the carbon dioxide into carbonate ions ($CO_3^{2-}$), and an anode electrode which produces electric energy by a reaction of the carbonate ions ($CO_3^{2-}$) and hydrogen and which discharges carbon dioxide.

5. The industrial plant of claim 4, wherein
the forward osmosis type fresh water composite system further comprises a heat recovery steam generator which is supplied with exhaust gases of the fuel cell apparatus and which supplies thermal energy to the draw solution separation unit.

6. The industrial plant of claim 2, wherein the carbon dioxide collection unit is disposed between the forward osmosis separation apparatus and the heat recovery steam generator.

7. The industrial plant of claim 5, wherein the carbon dioxide collection unit is disposed between the forward osmosis separation apparatus and the heat recovery steam generator.

* * * * *